United States Patent [19]

Tsai

[11] Patent Number: 5,711,656
[45] Date of Patent: Jan. 27, 1998

[54] AQUARIUM PUMP HAVING SILENCING EFFECT

[76] Inventor: Hsien-tang Tsai, No. 4-1, Ta-Guang Street, Taichung City, Taiwan

[21] Appl. No.: 741,324
[22] Filed: Oct. 29, 1996
[51] Int. Cl.$^6$ .................................................. F04B 39/12
[52] U.S. Cl. .................................... 417/312; 417/412
[58] Field of Search ............................ 417/312, 412, 417/472, 540; 181/230, 207, 208; 210/416.2, 169; 137/854, 519.15

[56] References Cited

U.S. PATENT DOCUMENTS

| | | | |
|---|---|---|---|
| 3,825,374 | 7/1974 | Kondo | 417/413.1 |
| 4,137,016 | 1/1979 | Itakura | 417/413.1 |
| 4,749,003 | 6/1988 | Leason | 137/854 |
| 4,792,293 | 12/1988 | Wang | 417/413.1 |
| 5,052,904 | 10/1991 | Itakura et al. | 417/413.1 |
| 5,137,432 | 8/1992 | Tsai | 417/413.1 |
| 5,360,323 | 11/1994 | Hsieh | 417/413.1 |

*Primary Examiner*—Timothy Thorpe
*Assistant Examiner*—Peter G. Korytnyk
*Attorney, Agent, or Firm*—Pro-Techtor International

[57] ABSTRACT

An aquarium pump comprises an air cylinder provided therein with an air admitting chamber, an air inputting chamber, an air outputting chamber, an air discharging chamber, an air winding chamber, and an air cap. As the air cap is actuated, the atmospheric air is drawn into the air cylinder in which the speed of the atmospheric air is reduced by the winding air ducts and the volute air ducts of the chambers. As the air cap is compressed, the air is forced out of the air cylinder via an air output tube without making noise.

4 Claims, 18 Drawing Sheets

AQUARIUM PUMP HAVING SILENCING EFFECT

FIELD OF THE INVENTION

The present invention relates generally to an aquarium pump, and more particularly to a quiet aquarium pump.

BACKGROUND OF THE INVENTION

As shown in FIG . 1, art aquarium pump of the prior art has an air cylinder 10, which is provided in the bottom thereof with an air admitting cell 11 and an air conveying cell 12. The air admitting cell 11 and the air conveying cell 12 are separated by a partition. The air cylinder 10 is further provided in the tipper portion thereof with an upper air cell 13, as shown in FIG. 2. The air admitting cell 11 is in communication with the atmosphere via an air inlet 110. Now referring to FIG. 3, the upper air cell 13 is provided with an air cap 20 attached to the outer portion of the upper air cell 13. The upper air cell 13 is provided therein with an air admitting hole 130 via which the upper air cell 13 is in communication with the air admitting cell 11. The upper air cell 13 is further provided therein with an air transporting hole 131 via which the upper air cell 13 is in communication with the air conveying cell 131. The air admitting hole 130 is provided with a movable membrane 132, whereas the air transporting hole 131 is also provided with the movable membrane 132. As the air cap 20 is actuated, the atmospheric air is admitted to the air cylinder 10 such that the atmospheric air enters the air admitting cell 11 via the air inlet 110 before the movable membrane 132 of the air admitting hole 130 is pushed aside by the atmospheric air to allow the attmospheric air to flow into the upper air cell 13. In view of the compression of the air cap 20, the atmospheric air is transported through the air transporting hole 131 to push aside another movable membrane 132 such that the atmospheric air is admitted to the air conveying cell 12 from which the air is pumped out by an air tube. When the atmospheric air is sent from the air admitting cell 11 to the air conveying cell 12, the air flow and the partition are subject to resonance capable of increasing the intensity of the sound or noise. As a result, the prior art aquarium pump described above is rather noisy when it is at work.

As illustrated in FIGS. 4 and 5, another prior art aquarium pump comprises an air cylinder 14 which has in the bottom thereof an air chamber 15, an air admitting valve cell 16, an air discharging valve cell 17, and an air transporting cell 18. The air cylinder 14 has in the upper portion thereof an air pumping chamber 19. The air chamber 15 is in communication with the atmosphere via an air hole 150 and with the air admitting valve cell 16 via an 15 indentation 160 of the air admitting valve cell 16. The air discharging valve cell 17 is provided with an indentation 170 via which the air discharging valve cell 17 is in communication with the air transporting cell 18 which is in turn connected with an air tube. The air pumping chamber 19 is provided with an air cap 20 and is further provided therein with an air admitting valve hole 190 via which the air pumping chamber 19 is in communication with the air admitting valve cell 16, as shown in FIG. 6. In addition, the air pumping chamber 19 is provided therein with an air discharging valve hole 191 via which the air pumping chamber 19 is in communication with the air discharging valve cell 17. The air admitting valve hole 190 is provided with a valve piece 192, whereas the air discharging valve hole 191 is provided with another valve piece 192. As the air cap 20 is actuated, the atmospheric air is admitted to the air cylinder 14. The air is admitted to the air chamber 15 via the air hole 150 and is then admitted instantly to the air admitting valve cell 16 via the indentation 160, thereby causing the valve piece 192 to be pushed aside directly by the air, which is then admitted to the air pumping chamber 19 via the air admitting valve hole 190. In view of the compression of the air cap 20, the air is allowed to pass through the air discharging valve hole 191 so as to push aside the valve piece 192 before the atmospheric air is admitted to the air transporting cell 18 via the indentation hole 170 of the air discharging valve cell 17. The atmospheric air is finally pumped out via an air tube. The atmospheric air is admitted to the air cylinder 14 without being buffered. The fast-moving air and the inner wall of the air cylinder 14 bring about the resonance phenomenon capable of intensifying the noise.

The Taiwanese Patent Nos. 158860 and 147687 disclose respectively an aquarium pump having a buffer chamber for providing the silencing effect. However, the aquarium pump must increase in volume in order to accommodate the buffer chamber. The addition of the buffer chamber can result in an increase in the production cost of the aquarium pump. Moreover, the shape of the aquarium pump must be compromised in order to accommodate the buffer chamber. Such a compromise can have a negative impact on the marketability of the aquarium pump.

Furthermore, the air cylinder of the aquarium pump has an air cap 20 which actuated by an electromagnetically-operated rockng arm 1, as illustrated in FIG. 7. The atmospheric air is drawn into an air pumping chamber 19 via the air admitting valve cell 16 and the air admitting valve hole 190 when the air cap 20 is pulled upwards. If the air cap 20 is actuated to move downwards, the air contained in the air pumping chamber 19 is forced out from the output tube via the air discharging valve hole 191 and the air transporting cell 18. The air admitting valve hole 190 and the air discharging valve hole 191 are provided with a valve piece locating rod 193, a valve piece 192 and a position limiting jacket 194, as shown in FIG. 8. The valve piece locating rod 193 is located in the midsegment of the valve hole. The valve piece 192 is provided with a rod hole, as shown in FIG. 9. The rod hole is fitted over the locating rod 193 before the position limiting jacket 194 is fitted over the locating rod 193. The air current is prevented from flowing back via the valve holes 190 and 191 in view of the fact that the valve holes 190 and 191 are sealed off by the valve piece 192. When the air cap 20 is pulled upwards, the valve piece 192 is curved upwards to open up the air admitting valve hole 190 so as to allow the air to enter the air pumping chamber 19. On the contrary, when the air cap 20 is pushed downwards, the valve piece 192 is curved downwards by the compressed air which is contained in the air pumping chamber 19. As a result, the air discharging valve hole 191 is opened up to allow the air to be pumped out. The output of the air from the air cylinder 14 persists as long as the rocking arm 1 keeps swinging.

It is therefore readily apparent that the air output efficiency of the prior at aquarium pumps is dependent on the quality of performance of the air cylinder of the pumps and the air resisting effect of the valve piece of the air valve portion.

The air valve piece 192 of the air valve portion of the air cylinder of the prior art aquarium pumps is a round flat membrane and provided with a rather small contact area located between the rod hole 324 and the valve piece locating rod 193. The contrast area serves as an adhering area, which too small to bring about an excellent locating effect. In addition, the thin valve piece 192 is easily deformed such that the effect of the air flow resistance of the valve piece 192 is seriously undermined. Even though the position limiting jacket 194 is used to assist the valve piece 192 to be located securely on the locating rod 193, the valve piece 192 can not be still located securely in view of the fact that the position limiting jacket 194 can not be secured to a proper position locating rod 193. For example, if the position limiting jacket 194 is forced inwards excessively, the periphery of the valve piece 192 is easily deformed, as shown in FIG. 10. Moreover, if the position limiting jacket 194 is fitted over the locating rod 193 such that the position limiting jacket 194 is not in contact with the valve piece 192, it is very likely that the valve piece 192 is bound to slide on the locating rod 193, and that the air flow resistance of the valve piece 192 is therefore seriously undermined. For this reason, it is very important that the proper fitting position of the position limiting jacket 194 is checked carefully.

As shown in FIGS. 12 and 13, a prior art pump disclosed in the Taiwanese Patent No. 172173 is provided with a leg pad for preventing the pump from moving aside. The leg pad has a tapered bottom, as shown in FIGS. 12 and 13. However, such a leg pad as described above is ineffective in averting the sliding of the pump. The leg pad 40 is provided with a locating hole 41, which is engaged with a fastening rod 51 of the pump base 50. The leg pad 40 is incapable of averting the resonance. Another prior art leg pad 60 is illustrated in FIGS. 14 and 15 and is provided with a fastening portion 61, which is engaged with a fastening hole 52 of a base 50. The leg pad 60 has a tapered bottom having threads 63 for minimizing the resonance. However, the leg pad 60 is incapable of absorbing effectively the shock transmitted from the base 50. As a result, the problem of resonance persists.

SUMMARY OF THE INVENTION

It is therefore the primary objective of the present invention to provide a quiet aquarium pump, which comprises an air cylinder provided in the bottom portion thereof with an air admitting chamber, an air inputting chamber, an air outputting chamber, and an air discharging chamber. The air cylinder is further provided in the top portion thereof with an air winding chamber. The air admitting chamber is in communication with the atmosphere via an air inlet of the air admitting chamber. The air inputting chamber is provided with an indentation through which the air inputting chamber is in communication with the air admitting chamber. The air outputting chamber is also provided with an indentation through which the air outputting chamber is in communication with the air discharging chamber which is in turn connected with an air output tube. The air winding chamber is provided with an air cap and an air entry hole through which the air winding chamber is in communication with the air inputting chamber. The air winding chamber is further provided with an air exit hole through which the air winding chamber is in communication with the air outputting chamber. The air entry hole and the air exit hole are provided respectively with a stopping membrane. The air admitting chamber is provided therein with a plurality of the curved air ducts, whereas the air inputting chamber is provided therein with a plurality of volute air ducts. The air discharging chamber is provided with a plurality of curved air ducts. The atmospheric air is drawn into the air admitting chamber such that the air speed is reduced by the curved air ducts of the air admitting chamber so as to alleviate the noise. The air speed is further reduced by the volute air ducts of the air inputting chamber when the atmospheric air is guided into the air winding chamber via the air entry hole. The air is then compressed by the air cap before the air is guided into the air discharging chamber via the air outputting chamber. The air noise is further reduced as the air is guided through the curved air ducts of the air discharging chamber.

It is another objective of the present invention to provide a quiet aquarium pump, which comprises a cylinder provided therein with a membrane mounting rod, a membrane, and a membrane locating jacket. The membrane mounting rod is fitted into the through hole of the membrane such that the membrane is located securely by the membrane locating jacket. The membrane is provided with a flange encircling along the fringe of the through hole for securing the membrane to the membrane locating rod in such a manner that the membrane is less vulnerable to deformation.

It is still another objective of the present invention to provide an aquarium pump with a leg pad which is fastened at one end thereof with the base of the aquarium pump and is provided at another end thereof with a tapered body of a hollow construction. The tapered body is provided in the outer surface thereof with a plurality of circular grooves capable of absorbing shock to avert the sliding and the resonance of the aquarium pump.

DETAILED DESCRIPTION OF THE EMBODIMENTS

Figure 1:
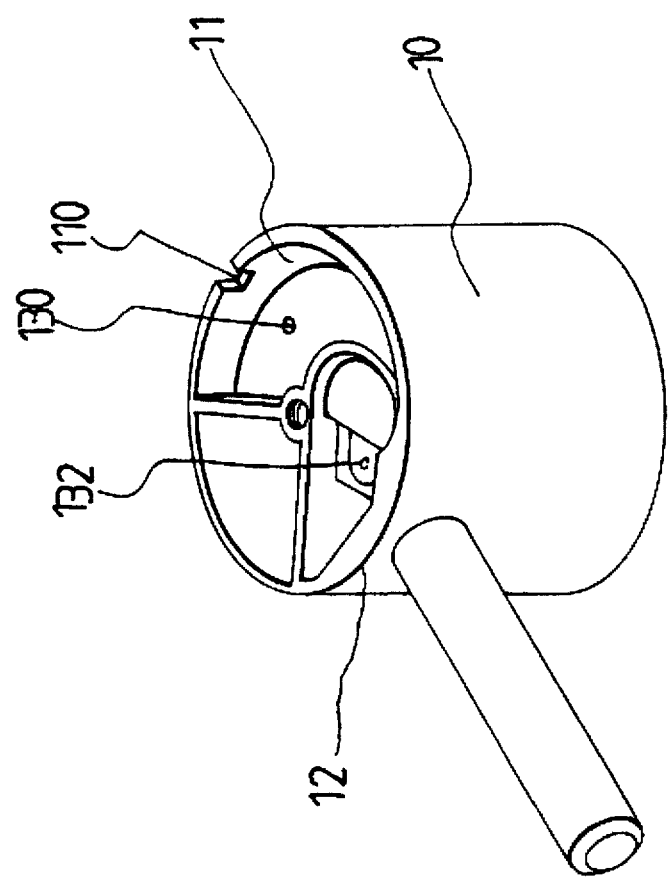
FIG. 1 shows a schematic view of an air cylinder of a first prior art aquarium pump.
Figure 2:
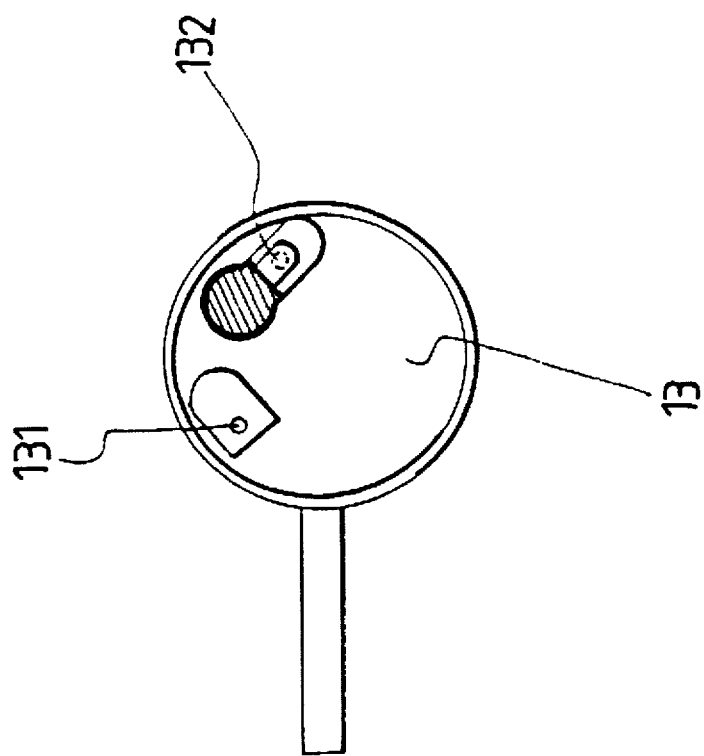
FIG. 2 shows a schematic view of one side of the air cylinder as shown in FIG. 1.
Figure 3:
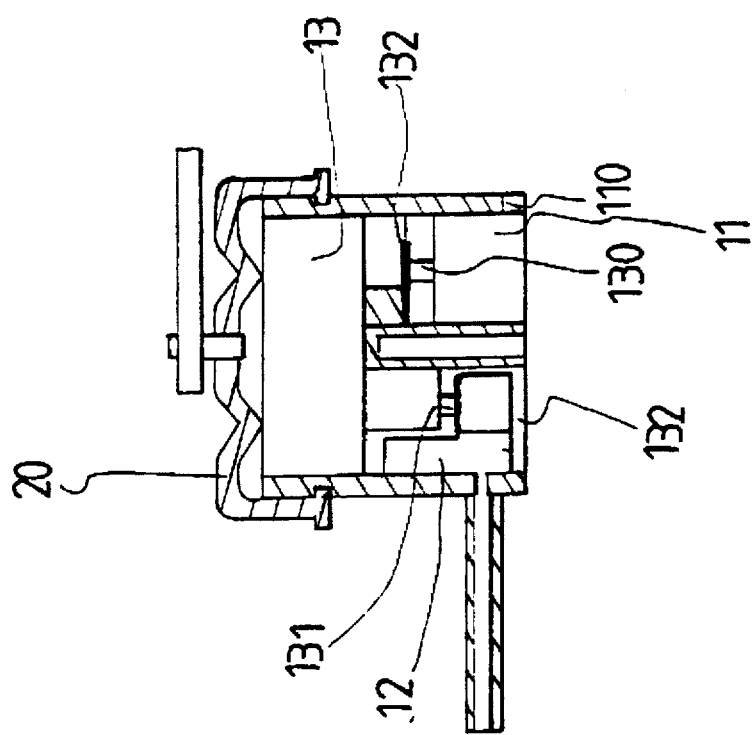
FIG. 3 shows a sectional view of the air cylinder as shown in FIG. 1.
Figure 4:
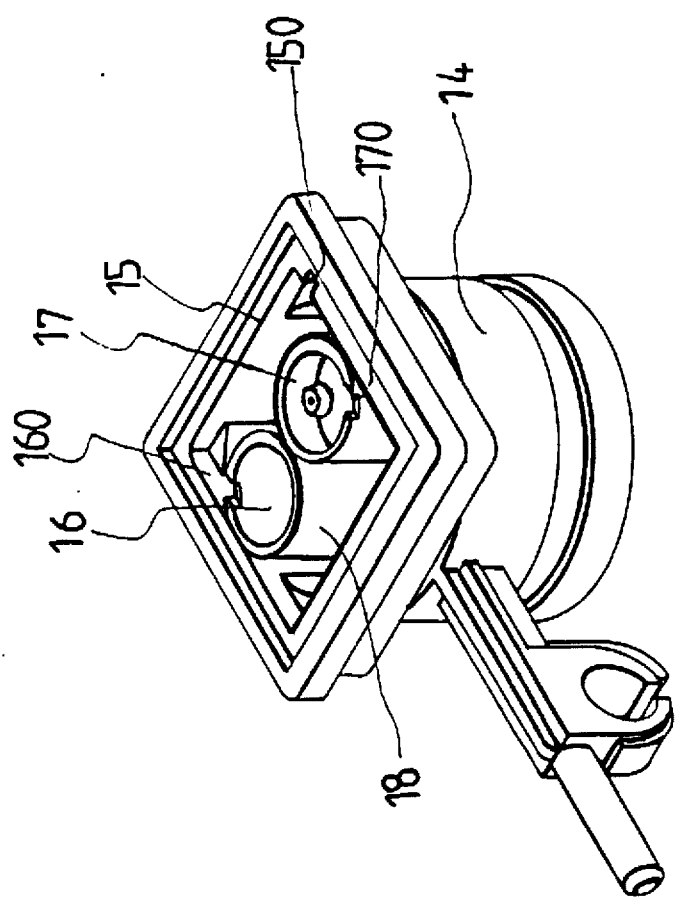
FIG. 4 shows a schematic view of an air cylinder of a second prior art aquarium pump.
Figure 5:
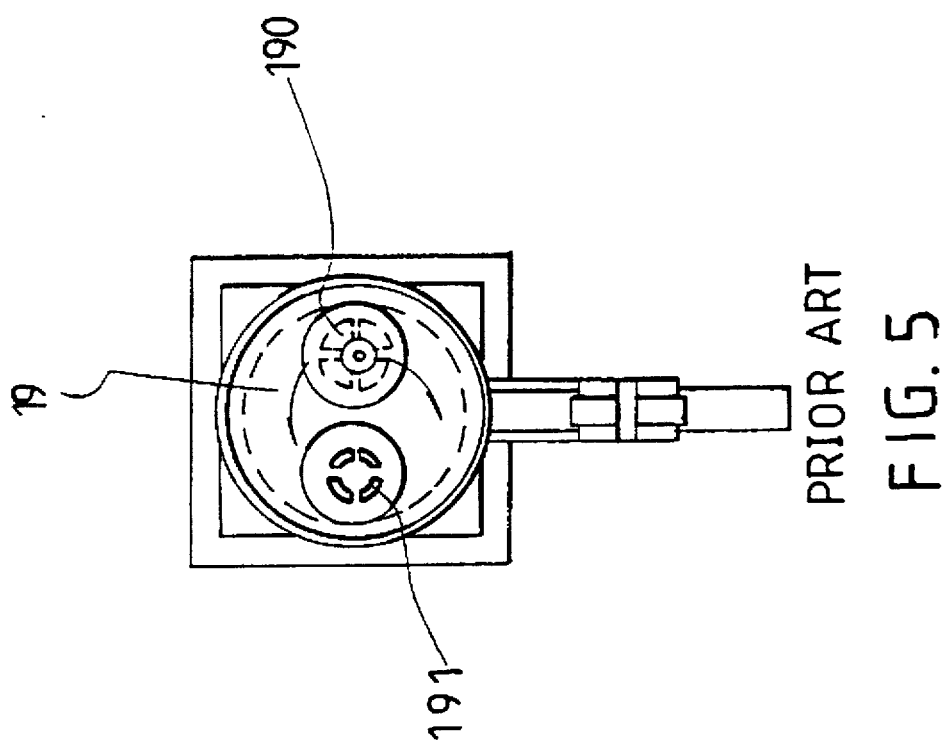
FIG. 5 shows a schematic view of one side of the air cylinder as shown in FIG. 4.
Figure 6:
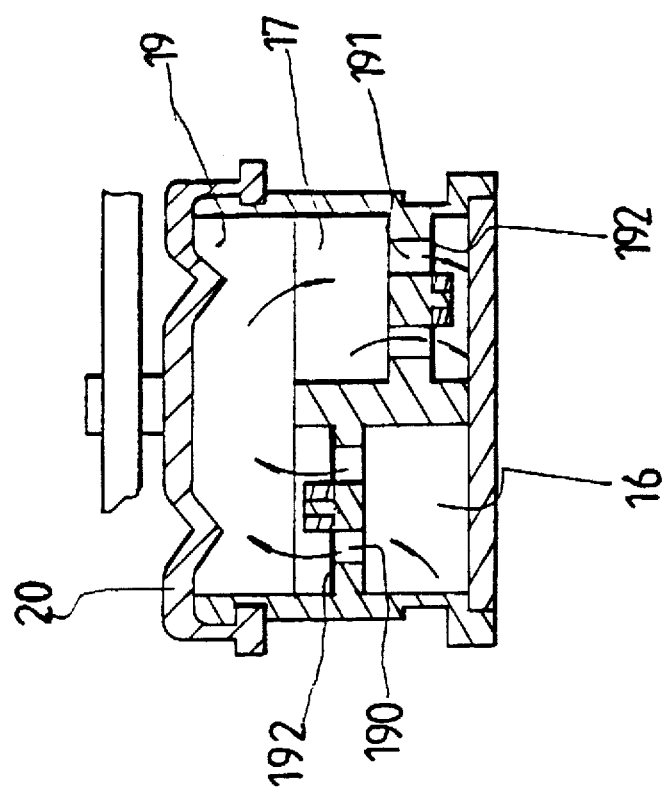
FIG. 6 shows a sectional view of the air cylinder as shown in FIG. 4.
Figure 7:
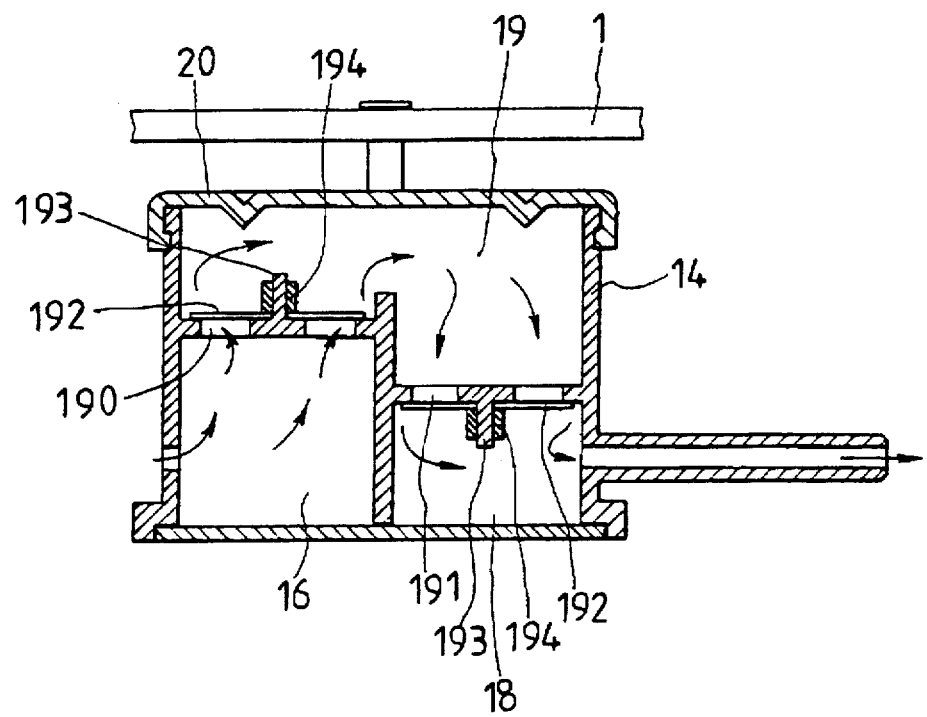
FIG. 7 shows a schematic view of an air cylinder of a third prior art aquarium pump.
Figure 8:
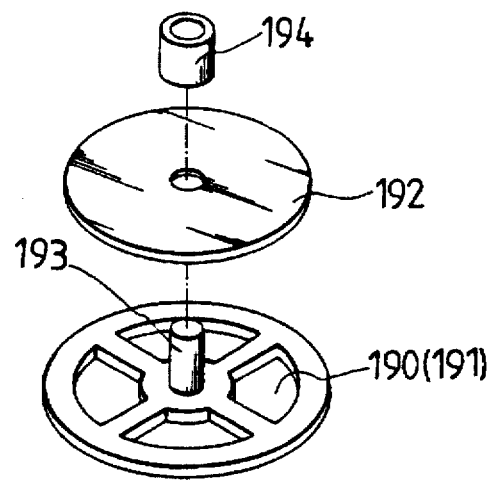
FIG. 8 shows an exploded view of the air cylinder of the prior art aquarium pump.
Figure 9:
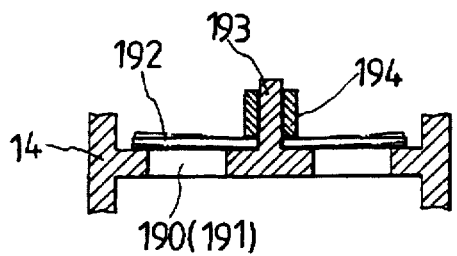
FIG. 9 shows a sectional view of the air cylinder in combination according to the prior art aquarium pump.
Figure 10:
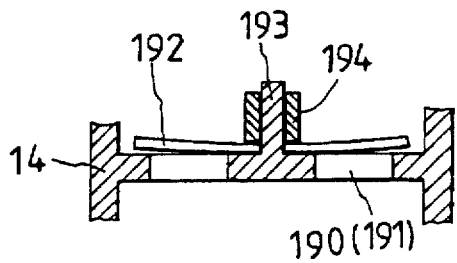
FIG. 10 shows a schematic view of the air cylinder in a poor combination according to the prior art aquarium pump.
Figure 11:
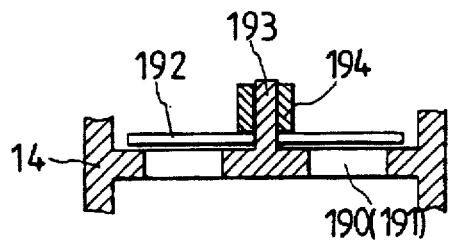
FIG. 11 shows another schematic view of the air cylinder in a poor combination according to the prior art aquarium pump.
Figure 12:
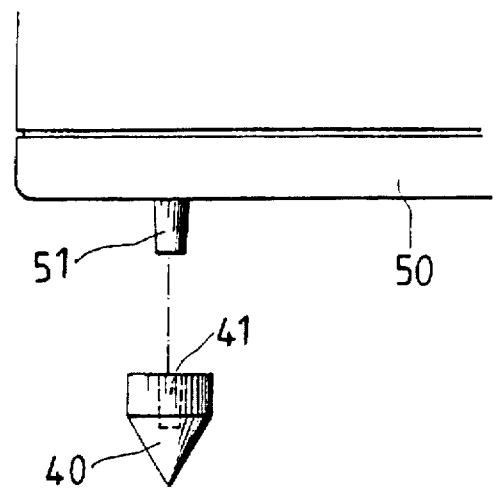
FIG. 12 shows a schematic view of a leg pad of the prior art aquarium pump.
Figure 13:
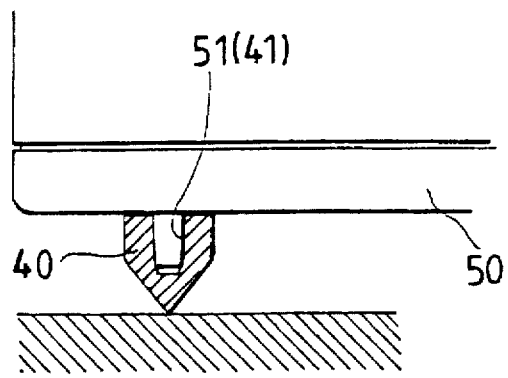
FIG. 13 shows a schematic view of the leg pad at work according to the prior art aquarium pump.
Figure 14:
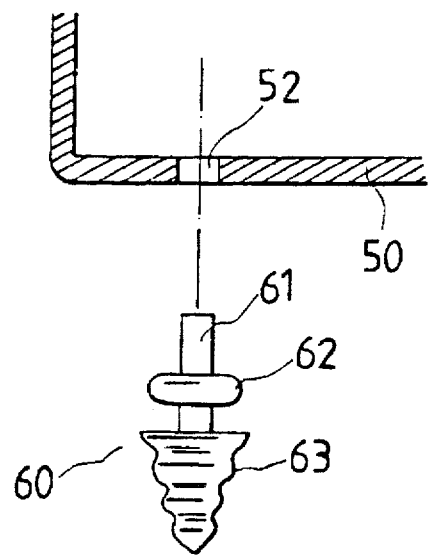
FIG. 14 shows a schematic view of another leg pad of the prior art aquarium pump.
Figure 15:
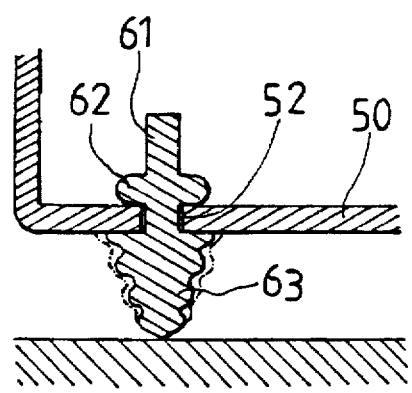
FIG. 15 shows a schematic view of another leg pad at work according to the prior art aquarium pump.
Figure 16:
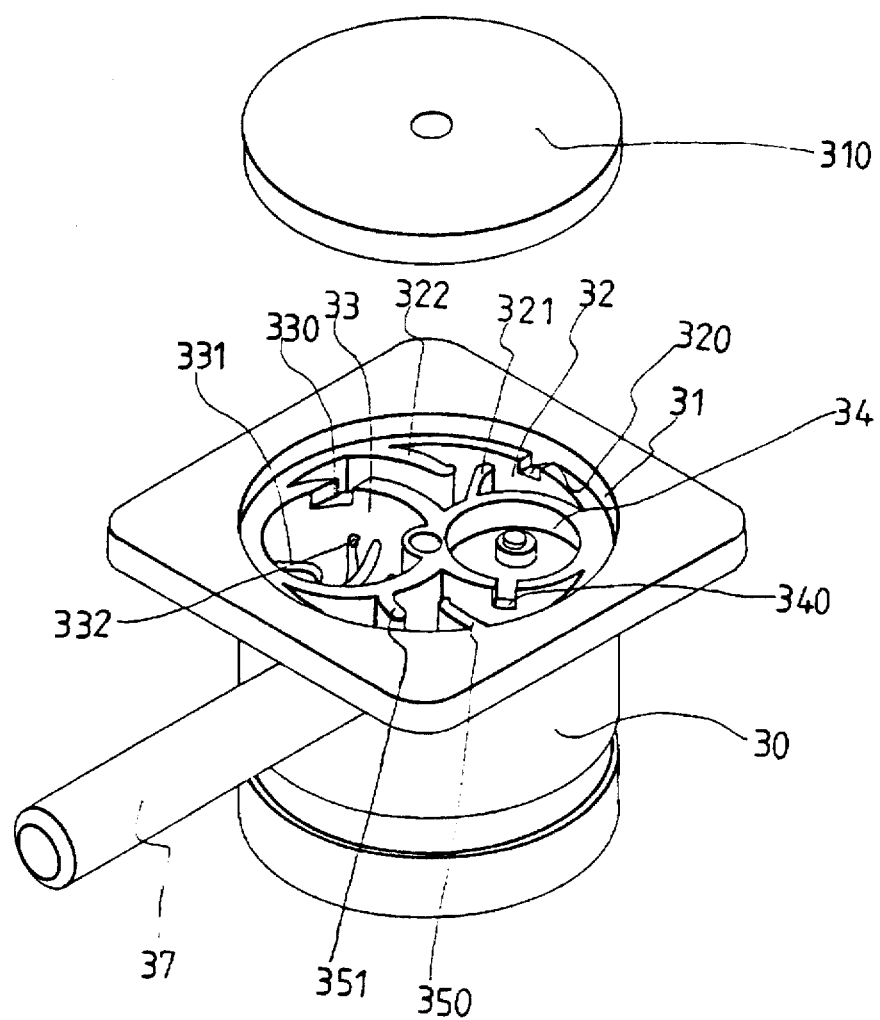
FIG. 16 shows a schematic view of the present invention.
Figure 16:
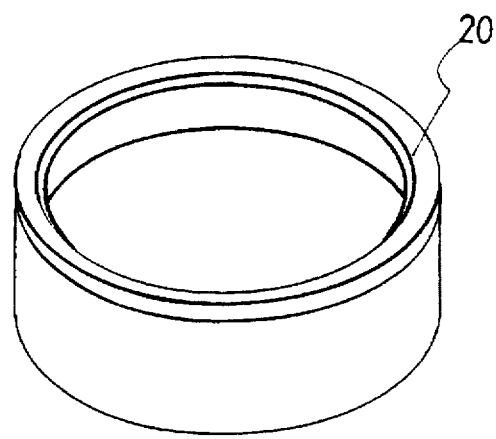
Figure 17:
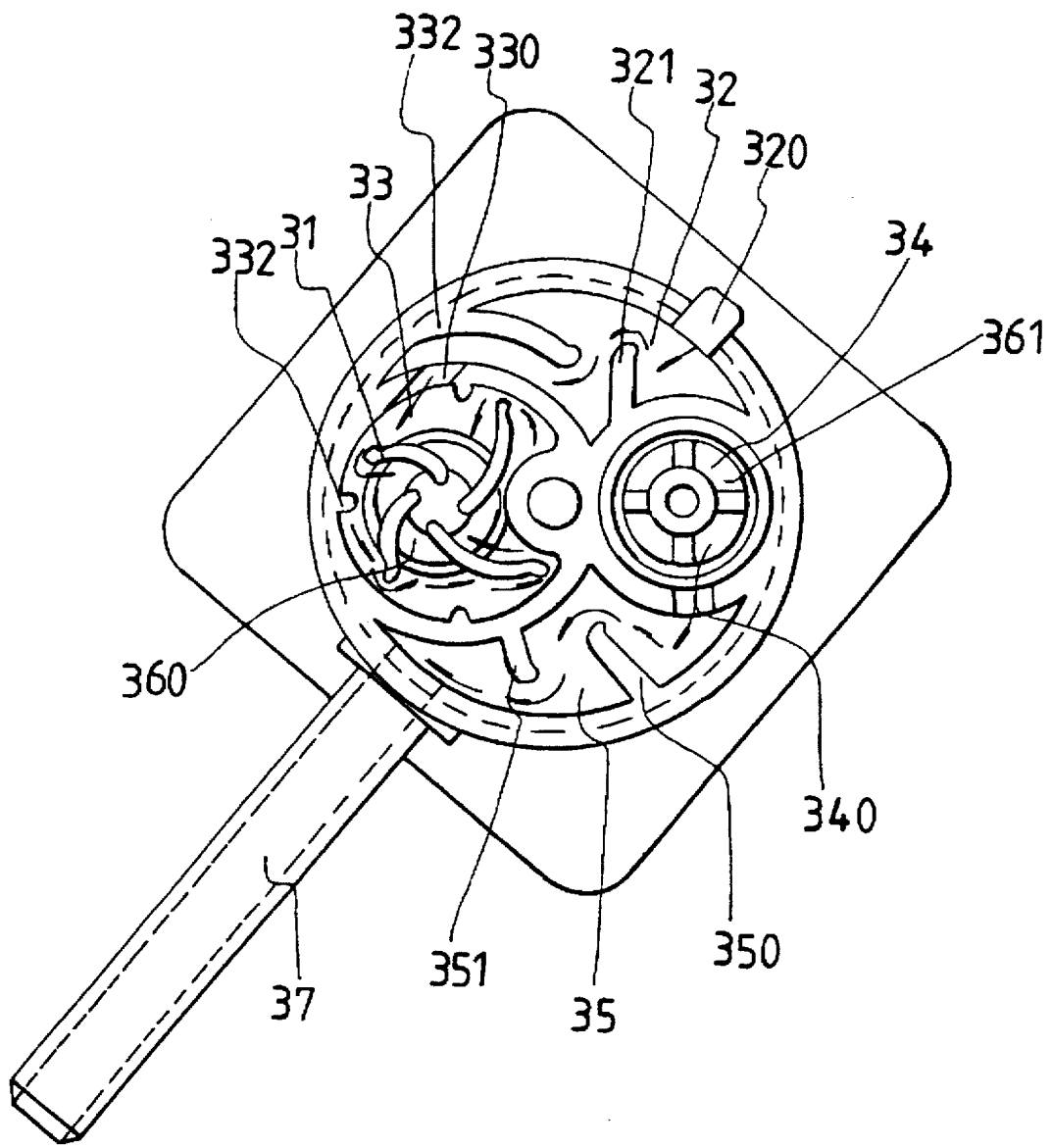
FIG. 17 shows a schematic view of the bottom of an air cylinder of the present invention.
Figure 18:
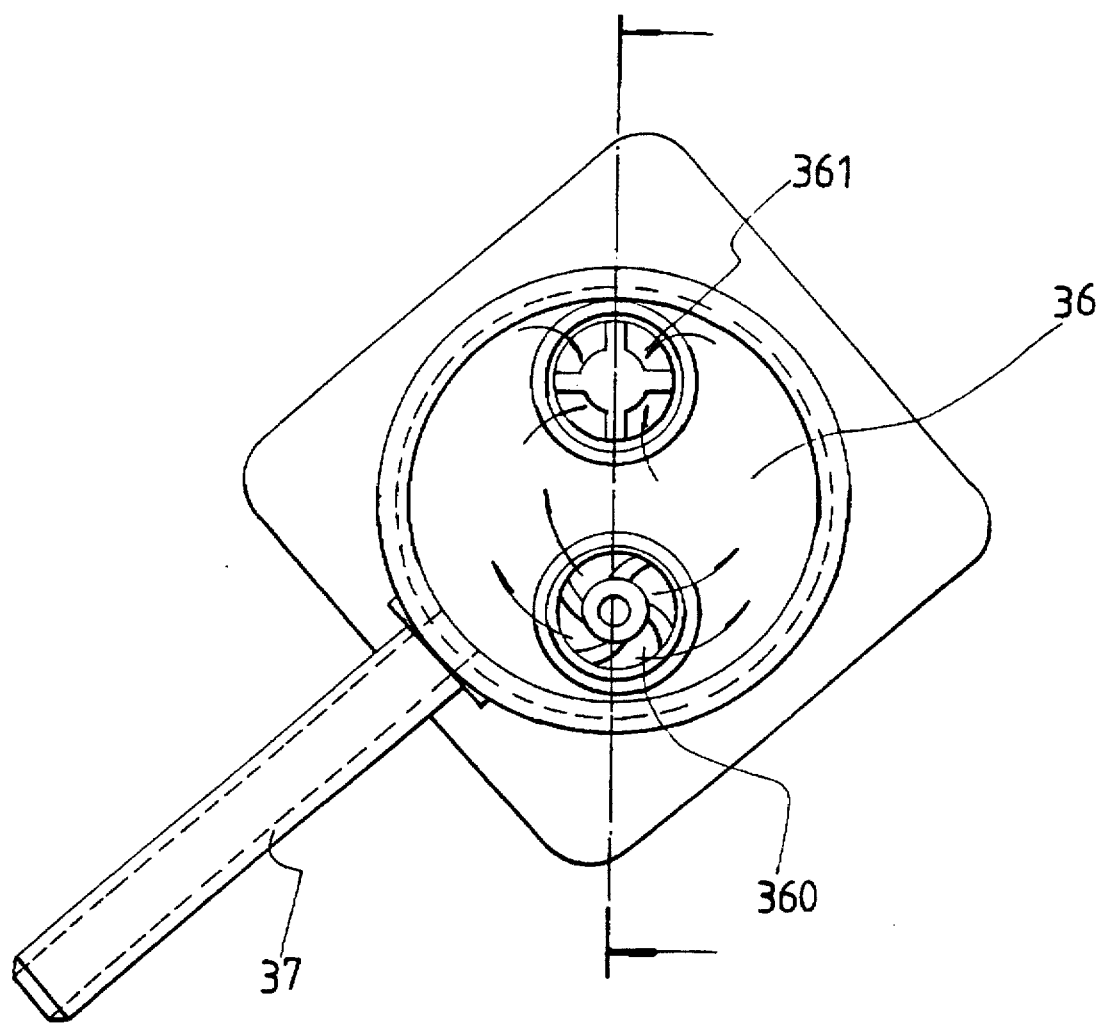
FIG. 18 shows a schematic view of the top of the air cylinder of the present invention.
Figure 19:
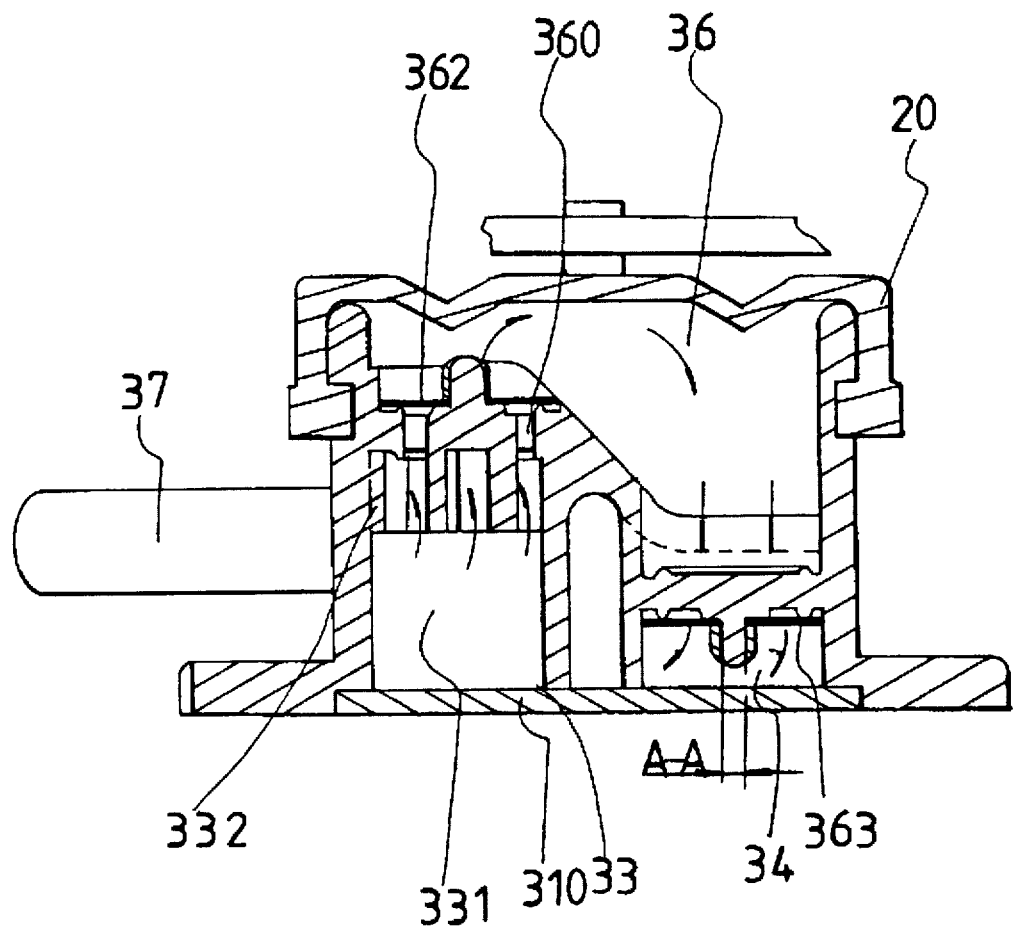
FIG. 19 shows a sectional view of the air cylinder of the present invention.

As shown in FIGS. 16 and 17, an aquarium pump embodied in the present invention is composed of an air cylinder which is provided in the bottom thereof with a slot 31 having an air admiring chamber 32, an air inputting chamber 33, an air outputting chamber 34, and an air discharging chamber 35. The slot 31 is provided therein with a rubber pad 310. The air cylinder 30 is further provided in the top thereof with an air winding chamber 36, as shown in FIGS. 18 and 19.

The air admitting chamber 32 is provided with an air inlet 320 through which the air admitting chamber 32 is in communication with the atmosphere. The air admitting chamber 32 is in communication with the air inputting chamber 33 through an indentation 330 of the air inputting chamber 33. Similarly, the air outputting chamber 34 is provided with an indentation 340 through which the air outputting chamber 34 is in communication with the air discharging chamber 35, which is connected with an air output tube 37.

The air winding chamber 36 is provided with an air cap 20 fastened therewith and is further provided therein with an air entry hole 360 through which the air winding chamber 36 is in communication with the air inputting chamber 33. The air winding chamber 36 is still further provided with an air exit hole 361 through which the air winding chamber 36 is in communication with the air outputting chamber 34. The air entry hole 360 is provided with a membrane 362, whereas the air exit hole 361 is provided with a membrane 363.

The air admitting chamber 32 is provided therein with a first stopping plate 321 which is located between the air entry hole 320 and the indentation 330 of the air inputting chamber 33. The air admitting chamber 32 is further provided therein with a second stopping plate 322 forming an angle of 90 degrees along with the first stopping plate 321. In other words, the air admitting chamber 32 is provided therein with the curved and winding air ducts.

The air inputting chamber 33 is provided therein with four curved guide blades 331, which are arranged spirally and unidirectionally such that two adjoining guide blades 331 are provided therebetween with a protruded portion 332. In other words, the air inputting chamber 33 is provided therein with the volute air ducts.

The air discharging chamber 35 is provided therein with a third stopping plate 350 which is located between the indentation 340 of the air outputting chamber 34 and the air output tube 37. The air discharging chamber 35 is further provided therein with a fourth stopping plate 351 which forms a plurality of winding air ducts along with the third stopping plate 350.

Figure 20:
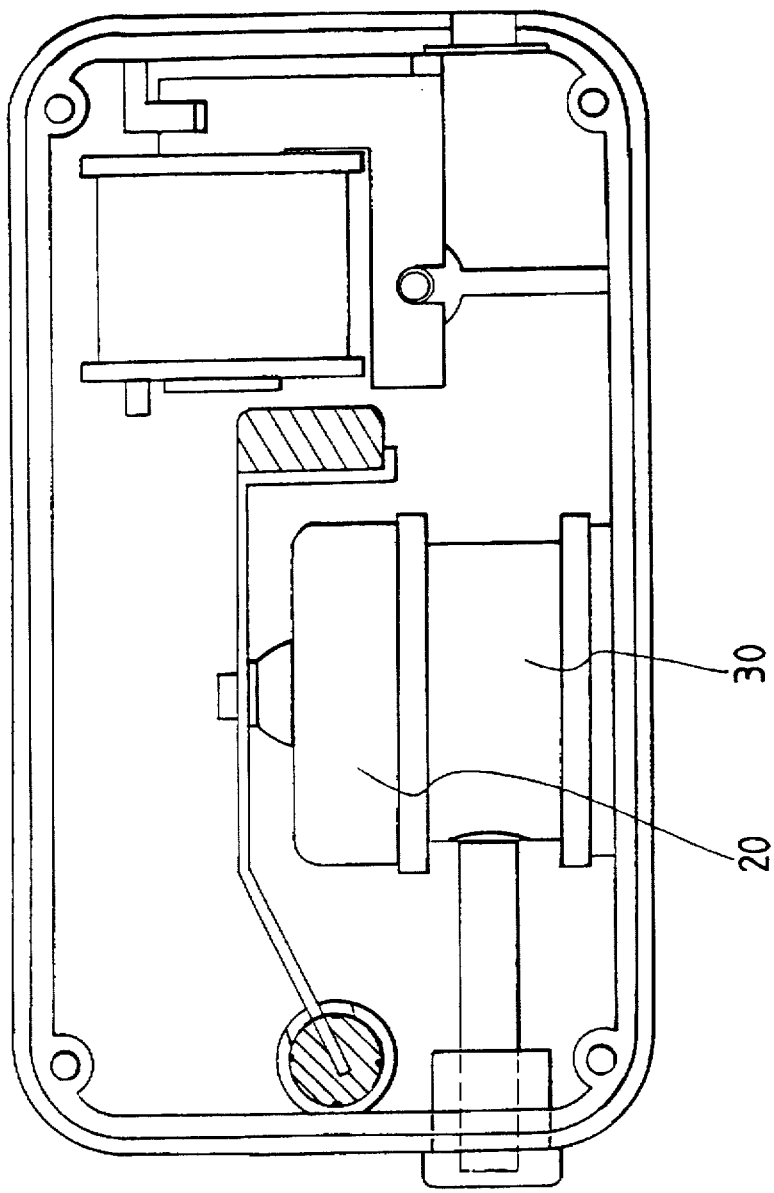
FIG. 20 shows a schematic view of the present invention at work.

In operation, the atmospheric air is drawn into the air cylinder 30 by the action of the air cap 20, as illustrated in FIG. 20. As the air flows through the winding air ducts of the air admitting chamber 32, the air speed is reduced such that the air entry noise is alleviated, as illustrated in FIGS. 17-19. As air flows through the indentation 330 of the air inputting chamber 33, the air speed is further reduced before the air current is guided by the protruded portion 332 to push away the membrane 362 mildly in order to enter the air winding chamber 36 via the air entry hole 360. The air entry noise is further alleviated. As the air is compressed by the air cap 20 and the membrane 363 is pushed away, the compressed air is guided to enter the air output tube 37 via the air exit hole 361 and the indentation 340 of the air inputting chamber 34. As the air flows through the winding air ducts of the air discharging chamber 35, the air noise is reduced. As a result, the air cylinder 10 of the aquarium pump of the present invention is relatively quiet when it is in operation.

Figure 21:
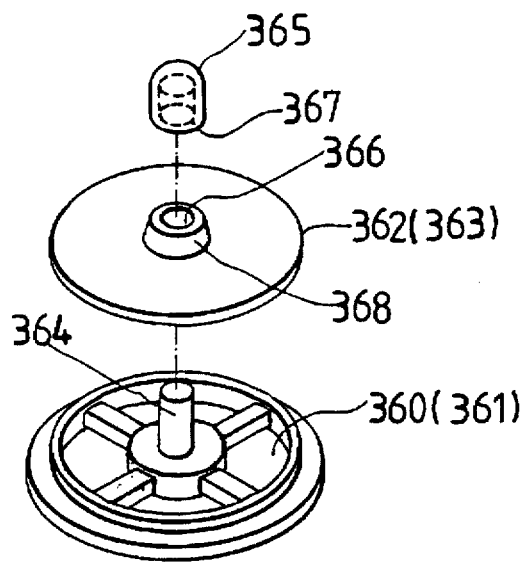
FIG. 21 shows an exploded view of an air valve portion of the air cylinder of the present invention.
Figure 22:
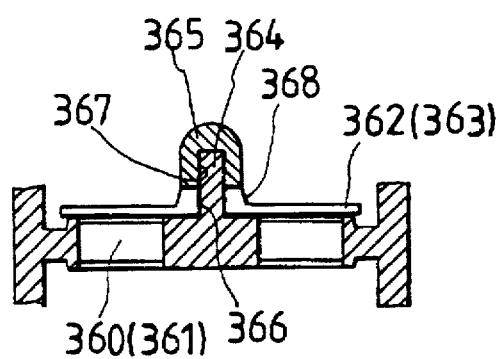
FIG. 22 shows a scetional view of the air valve portion in combination according to the present invention.

As shown in FIGS. 21 and 22, the air entry hole 360 and the air exit hole 361 of the air cylinder 30 are provided with a membrane mounting rod 364, membranes 362, 363, and a locating jacket 365. The membrane mounting rod 364 is located in the air entry hole 360 and the air exit hole 361 such that the membrane mounting rod 364 is fitted into the through holes 366 of the membranes 362 and 363, and the fitting hole 367 of the locating jacket 365. As a result, the membranes 362 and 363 are located securely on the membrane mounting rod 364.

As shown in FIGS. 21 and 22, the through holes 366 of the membranes 362 and 363 are provided respectively with a flange 368 encircling the through hole 366. The locating jacket 365 is of a caplike construction and is provided with a fitting hole 367 of a predetermined depth. The flange 368 is capable of improving the air transporting efficiency in view of the fact that the flange 368 enables the membrane 362 or 363 to return to its original position to seal off the air entry hole 360 or the air exit hole 361 immediately after the passage of air through the air entry hole 360 or the air exit hole 361. In addition, the flange 368 serves to reinforce the structural strength of the through holes 366 such that the through holes 366 are not damaged by the mechanical friction between the walls of the through holes 366 and the membrane mounting rod 364. Moreover, the flange 368 enables the membrane 362 or 363 to be located securely on the membrane mounting rod 364 in view of the fact that the flange 368 increases the contact area between the membrane 362 or 363 and the membrane mounting rod 364. Furthermore, the air entry hole 360 and the air exit hole 361 can be sealed off precisely by the membranes 362 and 363, thanks to the flanges 368 which make the membranes 362 and 363 invulnerable to deformation.

The fitting hole 367 of the locating jacket 365 has a predetermined depth and is therefore capable of being fitted over the membrane mounting rod 364 such that the membranes 362 and 363 are located with precision by the locating jacket 365.

Figure 23:
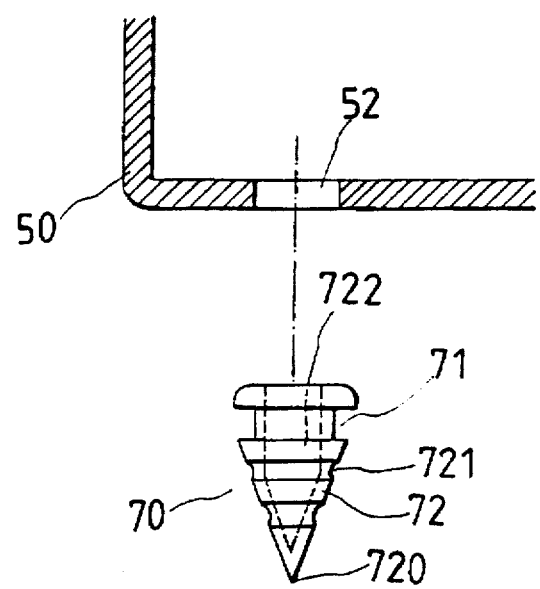
FIG. 23 shows a schematic view of the leg pad of the present invention.
Figure 24:
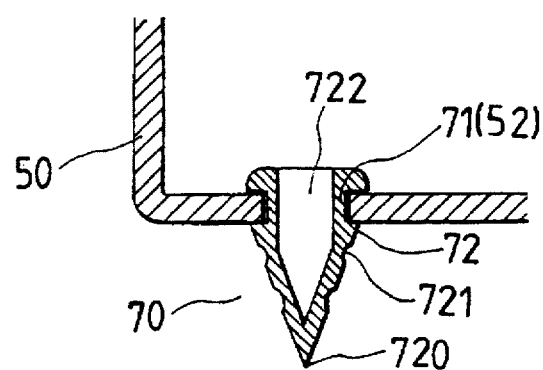
FIG. 24 shows a schematic view of the leg pad at work according to the present invention.
Figure 25:
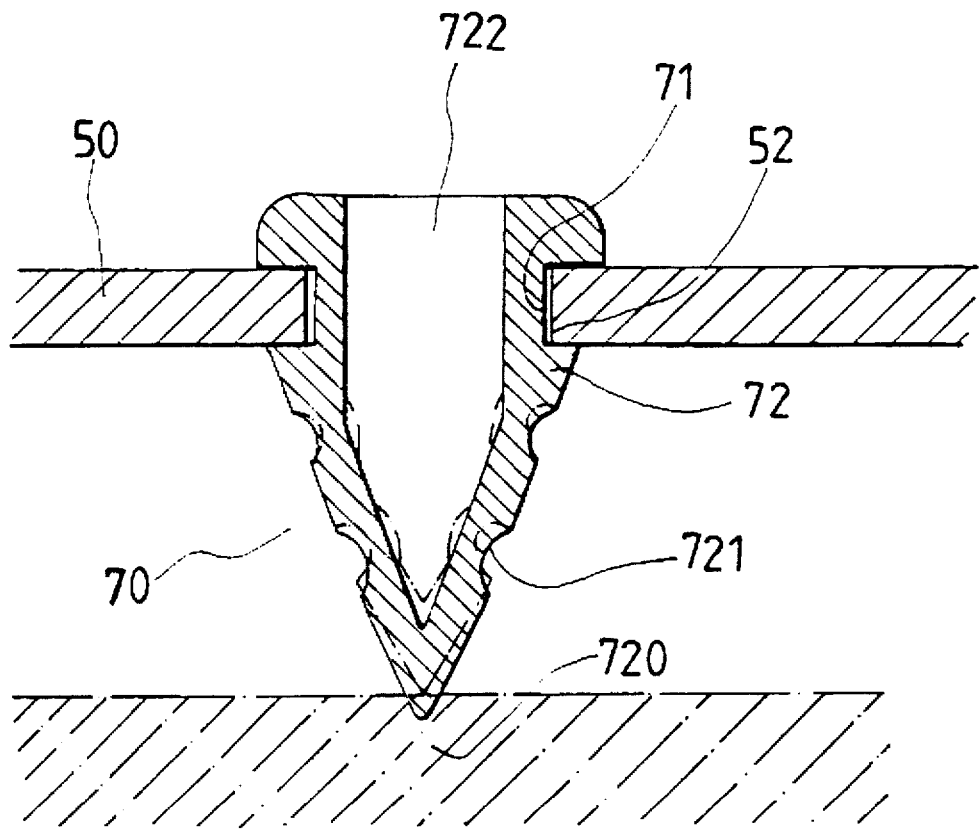
FIG. 25 shows another schematic view of the leg pad at work according to the present invention.

As shown in FIGS. 23 and 24, the aquarium pump, of the present invention is provided with a leg pad 70, which is in turn provided at the top portion thereof with a fastening groove 71 engageable with a fastening portion 52 of the base 50 of the aquarium pump of the present invention. The leg pad 70 has a tapered body 72 opposite in location to the fastening groove 71. The tapered body 72 is provided with a support end 720 of a tapered construction. The tapered body 72 is provided in the outer wall surface thereof with a plurality of flexible grooves 721 capable of alleviating the shock and is further provided with a core hole 722 for preventing the transmission of the shock wave from the base 50 to the support end 720, as illustrated in FIG. 25. As a result, the aquarium pump of the present invention can be located securely on a smooth surface such that the pump body is not caused to slide on the smooth surface, and that no resonance is brought about. The core hole 722 of the tapered body 72 also serves to eliminate the internal stress of the tapered body 72 of the leg pad 70 of the present invention.

What is claimed is:

1. An aquarium pump comprising a cylinder provided in a bottom portion thereof with an air admitting chamber, an air inputting chamber, an air outputting chamber, and an air discharging chamber, said cylinder further provided in a top portion thereof with an air winding chamber, said air admitting chamber being in communication with atmosphere via an air inlet thereof, said air admitting chamber being in communication with said air inputting chamber via an indentation of said air inputting chamber, said air outputting chamber being communication with said air discharging chamber via an indentation of said air outputting chamber, said discharging chamber being connected with an air output tube, said air winding chamber provided with an air cap attached to an outer surface of said air winding chamber, said air winding chamber further provided therein with an air entry hole for communicating said air winding chamber with said air inputting chamber, said air winding chamber still further provided with an air exit hole for communicating said air winding chamber with said air outputting chamber, said air entry hole and said air exit hole provided respectively with a membrane for opening and closing said air entry hole and said air exit hole;

wherein said air admitting chamber is provided therein with a plurality of winding air ducts for reducing the speed of atmospheric air drawn into said air admitting chamber;

wherein said air inputting chamber is provided therein with a plurality of volute air ducts formed by a plurality of guide blades arranged spirally for reducing the speed of the atmospheric air;

wherein said air outputting chamber and said air discharging chamber are provided with a plurality of winding air ducts;

wherein said air cap is actuated to draw the atmospheric into said air admitting chamber such that the speed of the atmospheric air is reduced by said winding air ducts of said air admitting chamber, and that the atmospheric air is drawn into said air inputting chamber before the atmospheric air is further drawn into said air winding chamber via said air entry hole;

wherein the atmospheric air in said air winding chamber is forced by the compression of said air cap into said air outputting chamber via said air exit hole of said air winding chamber before the atmospheric air is discharged via said air output tube without resonance.

2. The aquarium pump as defined in claim 1, wherein said membranes of said air entry hole and said air exit hole are located by a membrane mounting rod and a locating jacket such that through holes of said membranes are fitted over said membrane mounting rod engaging said air entry hole and said air exit hole, and that said locating jacket is fitted over said membrane mounting rod to prevent said membranes from sliding on said membrane mounting rod.

3. The aquarium pump as defined in claim 2, wherein said through holes of said membranes are provided respectively with a flange encircling said through holes for reinforcing the structural strength of said through holes of said membranes and for increasing the contact area between said membranes and said membrane mounting rod and further for making said membranes invulnerable to deformation.

4. The aquarium pump as defined in claim 1 further comprising a leg pad provided at a top portion thereof with a fastening groove engageable with a fastening portion of a base of said cylinder, said leg pad further provided with a tapered body opposite in location to said fastening groove and having a tapered support end, said tapered body further having in an outer wall surface thereof a plurality of flexible grooves capable of alleviating shock, said tapered body still further having a core hole for preventing the transmission of shock waves from said base of said cylinder to said support end of said tapered body and for eliminating internal stress of said tapered body.

* * * * *